United States Patent [19]

Gruener et al.

[11] Patent Number: 5,295,076
[45] Date of Patent: Mar. 15, 1994

[54] MACHINE FOR THE NON-CIRCULAR MACHINING OF WORKPIECES

[75] Inventors: Guenther Gruener, Bad Ueberkingen; Werner Philipp, Pluederhausen; Hans Pikisch, Eislingen, all of Fed. Rep. of Germany

[73] Assignee: Ex-Cell-O GmbH, Eislingen, Fed. Rep. of Germany

[21] Appl. No.: 766,752

[22] Filed: Sep. 27, 1991

[30] Foreign Application Priority Data

Oct. 2, 1990 [DE] Fed. Rep. of Germany ....... 4031079

[51] Int. Cl.$^5$ .............................................. G06F 15/46
[52] U.S. Cl. ........................... 364/474.29; 364/474.31; 364/474.11; 82/118
[58] Field of Search ................. 364/474.02, 474.06, 364/474.11, 474.29, 474.31, 474.35, 131, 136; 82/1.11, 18, 118, 137; 318/571, 625

[56] References Cited

U.S. PATENT DOCUMENTS

| Re. 33,910 | 5/1992 | Compton | 82/18 |
|---|---|---|---|
| 4,514,814 | 4/1985 | Evans | 364/474.11 |
| 4,646,595 | 3/1987 | Slee | 318/571 |
| 4,752,867 | 6/1988 | Backe et al. | 364/474.11 |

FOREIGN PATENT DOCUMENTS

| 0201230 | 11/1986 | European Pat. Off. |
| 2724808 | 12/1978 | Fed. Rep. of Germany |
| 2945587 | 10/1980 | Fed. Rep. of Germany |

OTHER PUBLICATIONS

D. Szepesi, et al., "Asymmetrische Werkstucke mit einem schnellansprechenden Servosystem drehen," Werkstatt und Betrieb, 123 (1990), pp. 396–400.

P. Stof, "Untersuchung von Moglichkeiten zur Reduzierung dynamischer Bahnabweichungen bei numerisch gesteuerten Werkzeugmaschinen," University of Stuttgart, 1978.

E. Knorr, "Numerische Bahnsteuerung zur Erzeugung von Raumkurven auf rotationssymmetrischen Korpern," University of Stuttgart, 1973.

H. Schwegler, "Beitrag zur Beschreibung und Programmierung von gekrummten Flachen und deren Fertigung auf numerisch gesteuerten Frasmaschinen," University of Stuttgart, 1972.

Werkstattstechnik 79, Pritschow et al., 1989, pp. 647–650.

Werkstattstechnik 80, Pritschow et al., 1990, pp. 383–386.

*Primary Examiner*—Jerry Smith
*Assistant Examiner*—Steven R. Garland
*Attorney, Agent, or Firm*—Barry R. Lipsitz

[57] ABSTRACT

In order to so improve a machine for the non-circular machining of workpieces comprising a machine frame, a workpiece spindle held on the machine frame for receiving a workpiece and having a C-axis sensor, a Z-slide displaceable parallel to the workpiece spindle and having a Z-axis sensor, an X-axis drive arranged on the Z-slide for advancing a tool towards the workpiece, an X-axis sensor for determining the position of the tool, and a control device, that it operates quickly and reliably, it is proposed that the control device comprise a numerical machine control system for activating the workpiece spindle and the Z-axis drive and include a numerical X-axis control system, that the X-axis control system activate the X-axis drive independently of the machine control system in accordance with the predetermined non-circular shape, and that a coordination take place between the machine control system and the X-axis control system after certain time intervals.

30 Claims, 11 Drawing Sheets

MACHINE FOR THE NON-CIRCULAR MACHINING OF WORKPIECES

BACKGROUND OF THE INVENTION

The invention relates to a machine for the non-circular machining of workpieces comprising a machine frame, a workpiece spindle held on the machine frame for receiving a workpiece, a C-axis sensor for determining the rotary positions of the workpiece spindle, a Z-slide arranged on the machine frame for displacement in the Z-direction parallel to the workpiece spindle and having a Z-axis drive, a Z-axis sensor for determining the position of the Z-slide, an X-axis drive arranged on the Z-slide for advancing a tool in the X-direction towards the workpiece, an X-axis sensor for determining the position of the tool, and a control device for activating the X-axis drive in dependence upon the values measured by the C-axis sensor, the Z-axis sensor and the X-axis sensor such that a non-circular workpiece shape predetermined for the control device is produced during the machining.

Such a machine is known, for example, from EP-A-0 201 230. This publication discloses a control device comprising a numerical control system in which an analog closed-loop control system for activating the C-axis drive is integrated. The numerical control system predetermines for the analog closed-loop control system the sequence of the data representing the non-circular shape of the workpiece in digital form so that the analog closed-loop control system only links the values of the X-axis sensor, the C-axis sensor and the Z-axis sensor.

Such a "mixed" control system brings problems and is subject to limitations with respect to its accuracy and the adaptability of its control characteristics to an X-axis drive.

The object underlying the invention is, therefore, to so improve a machine of the generic kind that it operates quickly and reliably and allows optimum adaptation to the chosen X-axis drive.

SUMMARY OF THE INVENTION

This object is accomplished in accordance with the invention in a machine of the kind described at the beginning by the control device comprising a numerical machine control system for activating the workpiece spindle and the Z-axis drive and including a numerical X-axis control system, by the X-axis control system activating the X-axis drive independently of the machine control system in accordance with the predetermined non-circular shape, and by a coordination taking place between the machine control system and the X-axis control system after certain time intervals.

The concept underlying the invention is that the control device is made up of two numerical control systems operating basically independently of one another, namely the machine control system and the X-axis control system and that the two control systems are coordinated with one another at certain time intervals. The X-axis control system operates completely independently of the machine control system and controls the X-axis drive in accordance with the predetermined, non-circular shape of the workpiece. The X-axis control system independently enters values from the X-axis sensor, the C-axis sensor and the Z-axis sensor and makes the necessary calculations for the activation of the X-axis drive.

The machine control system, for its part, controls the workpiece spindle and the Z-axis drive and all of the other operations in the inventive machine so that merely coordination between the machine control system and the X-axis control system is necessary after certain time intervals.

This makes it possible for the X-axis control system to be a very rapid control system tailored specially for the rapid activation of the X-axis drive, with its computing times not being impaired by other peripheral control operations, while, on the other hand, the machine control system carries out all of the peripheral control operations which can all run substantially slower than the activation of the X-axis drive and so the machine control system itself can be a conventional numerical machine control system.

Furthermore, with this control concept there is the advantage that owing to the numerical X-axis control system, it is in a simple way possible to adapt the control characteristics of this X-axis control system to the chosen X-axis drive by suitable choice of parameters, which is not possible with analog activation of the X-axis drive as known from the prior art mentioned at the beginning. In particular, complex control strategies are made possible in a simple way by the inventive solutions.

In order to gain as rapid access as possible to the values measured by the X-axis sensor, the C-axis sensor and the Z-axis sensor, provision is advantageously made for the X-axis control system to determine the values measured by the C-axis sensor and the X-axis sensor - and in the event the contour varies in the Z-direction, also the values measured by the Z-axis sensor - for the activation of the X-axis drive.

In a particularly expedient embodiment, two Z-axis sensors and two C-axis sensors are provided, one Z-axis sensor and one C-axis sensor being provided for the machine control system and one Z-axis sensor and one C-axis sensor for the X-axis control system. This enables decoupling of the control systems in a simple way and, in addition, the sensors can be adapted with respect to their resolution to the requirements of the individual control systems.

Since particularly precise positioning control of the tool is to be carried out in the present case, provision is advantageously made for the X-axis control system to check the X-position values of the tool and in accordance with the result to activate the X-axis drive via an actuating variable. This actuating signal is, for example, an actuating power which is then converted in accordance with the respective characteristics of the chosen X-axis drive into actuating variables for the latter.

In principle, it is possible to so design the X-axis control system that it constantly works off a program cycle successively and at certain points of the program cycle determines an actuating signal and activates the X-axis drive accordingly. It is, however, particularly advantageous for there to be integrated in the X-axis control system a clock generator which after expiration of a fixable time interval at discrete points in time starts a calculation routine in the course of which the actuating signal for the X-axis drive is determined. By providing a clock generator, the points in time at which a calculation routine is started in the X-axis control system and the actuating signal determined for the X-axis drive are predetermined right from the start owing to the time intervals. These time intervals are constant, discrete time intervals which are previously fixed in view of the required accuracy of the X-axis control system.

The calculation routine is expediently selected such that in the calculation routine that actuating signal is determined which is issued by this calculation routine at the point in time associated with this calculation routine.

The X-axis control system operates in a particularly simple way by predetermined operations being carried out successively in the calculation routine and after completion of the operations waiting for the calculation routine to be started again by the clock generator. In this way complicated program structures of the calculation routine are avoided. These make the computing times difficult to predict and hence lead to inaccuracies due to the actuating signal being issued after time intervals of different length from the start of the calculation routine onwards.

In a particularly advantageous variant of the X-axis control system, provision is made for the actuating signal to be calculated on the basis of actual position values and set position values after the actual position values have been entered. Herein it is particularly advantageous for the actuating signal to be determined on the basis of future actual position values calculated in advance and future set position values calculated in advance. This type of calculation of the actuating signal is referred to as predictive control and makes it possible to correct a lag error of the respective X-axis drive in a simple and precise way so that the tool is always standing exactly in the position in which it should stand in accordance with the respective actual C- and Z-position value at the respective point in time.

The X-axis control system is preferably designed so as to have associated with it a storage device for contour values in which parameters for the non-circular shape of the workpiece are stored.

With such an X-axis control system, the set X-position values are advantageously determined with the actual C- and Z-position values and the parameters in storage devices for contour values.

There are various possibilities for storing the parameters for the non-circular shape in the storage device for contour values. Within the scope of the inventive solution, it has proven particularly advantageous for the parameters for the non-circular shape to be filed as radii support points for successive discs of the workpiece in the storage device for contour values.

In order to save storage space and manage with as few radii support points as possible, provision is, furthermore, made for the X-axis control system to interpolate between the radii support points of a disc. Furthermore, in order to also keep the number of successive discs as low as possible, provision is made for the X-axis control system to interpolate between the radii support points of successive discs.

Interpolation between the support points and the discs makes it possible to file the information on the contour to be stored in a manner which saves as much storage space as possible and to nevertheless achieve high accuracy. Thus a cylindrical section can be precisely defined by two discs at the beginning and end of the same, whereas a complicated contour can be determined with the necessary accuracy by increasing the number of support points per disc and reducing the spacing of the discs.

For this reason, provision is made in accordance with the invention for the number of support points per disc and the spacing of the discs from one another to vary over a contour of the entire workpiece.

Furthermore, it is particularly advantageous for the X-axis control system to be freely programmable with respect to the contour, with the contour being entered either as support point field or as function.

Provision is, furthermore, expediently made for the X-axis control system to be provided with a CAD connection.

The way of calculating the future set X-position values has still to be explained. In a preferred embodiment, provision is made for the X-axis control system to determine the future set X-position value by calculating a future actual C-position value and advantageously, in addition, a future actual Z-position value. This calculation is based on the fact that the present actual C-position values and actual Z-position values change in accordance with the development of the same in the past, i.e., that the change in the actual C-position values and, in the given circumstances, in the actual Z-position values is constant over a short period of time so that on the basis of the previous actual C-position values and, in the given circumstances, actual Z-position values, the future actual C-position values and, in the given circumstances, actual Z-position values can be calculated with sufficient accuracy and, consequently, the future set X-position values calculated on this basis will also be sufficiently accurate.

Hence the interpolation between the radii support points of the discs and/or successive discs is preferably carried out by the X-axis control system with the future actual C-position values and, in the given circumstances, the future actual Z-position values.

In a particularly preferred embodiment of the inventive solution which is characterized by high accuracy, provision is made for the X-axis control system to determine a predetermined number of future set X-position values and to use these to calculate an actuating signal at a certain point in time.

In the simplest case this is done in such a way that at a certain point in time in the calculation routine, the set X-position values for future points in time are determined on the basis of the actual C-position values and actual Z-position values calculated for these points in time.

In a preferred embodiment which enables the computing time between entering the actual position values and issuing the actuating variable to be kept as short as possible, provision is made for the calculation of the future set X-position values to be carried out by the X-axis control system before the actual position values associated with a certain point in time are entered.

Herein it is particularly advantageous for the future set X-position values for a calculation routine to be calculated in the previous calculation routine so that in the respective calculation routine immediately after the start of the same, for example, one can start entering the actual position values corresponding to this point in time and thus avoid inaccuracies.

In the simplest case, provision is made, when calculating the future set X-position values for a calculation routine, for these to be determined for a predeterminable number of subsequent calculation routines. i.e., in a selected calculation routine at a certain point in time, those set X-position values are used for determining the actuating signal which are determined for a predeterminable number of subsequent calculation routines at the points in time corresponding to these. Herein it is possible to calculate the future set X-position values anew in each calculation routine or to use the previously calculated future set X-position values for the subsequent calculation routines further insofar as they also represent future set X-position values for these calculation routines. In the simplest case, this is carried out by restoring the future set X-position values in a shift register. Computing time is advantageously saved with this procedure.

The way of determining the future actual position values used in the inventive manner for the calculation of the actuating signal has still to be explained. In a preferred embodiment, provision is made for the future actual position values calculated in advance and used after a calculation routine to be calculated on the basis of the actual X-position value determined in this calculation routine.

Furthermore, provision is made in a preferred embodiment of the inventive solution for the actuating signal at the point in time of the previous calculation routine to be included in the advance calculation of the future actual X-position values in a certain calculation routine.

To determine the actuating signal, the procedure is preferably such that the actual X-position values calculated in advance and used in a calculation routine are the actual X-position values for a certain number of subsequent calculation routines and that with this certain number of future actual X-position values, the actuating signal is determined in this calculation routine.

The calculation of the actuating signal is preferably carried out such that there are included therein the difference between the future set X-position values calculated in advance and the future actual X-position values calculated in advance, provided with weighting coefficients, as well as the actuating signal of the previous calculation routine.

Details of the correlation between the X-axis control system and the machine control system were not given in the description of the embodiments hereinabove. This correlation can be carried out, for example, by the machine control system constantly monitoring the actuating signals of the X-axis control system. However, correlation between the X-axis control system and the machine control system is particularly simple when the X-axis control system requests a clearance signal from the machine control system. After that, the X-axis control system continues to work independently in trouble-free operation.

Provision is preferably made for the clearance signal to be requested outside the range of time between the entering of the sensor values for the calculation of one of the actuating variables and the issuing of the respective actuating variable.

With an X-axis control system which carries out one of the calculation routines described hereinabove, it has proven particularly advantageous for the clearance signal for the X-axis control system to be requested in the previous calculation routine, with the requesting of the clearance signal preferably being carried out after issue of the actuating signal. Such a solution has the great advantage that the time required for obtaining the clearance signal does not have a negative effect on the precision of the control as the requesting of the clearance signal is carried out in a section of the calculation routine in which the actuating signal has already been issued so that the time between the entering of the sensor values and the issuing of the actuating signal can be kept as short as possible.

In the description of the embodiments hereinabove, no details were given as to which X-axis drive is to be used. In a preferred embodiment, provision is made for the X-axis drive to comprise an electric linear motor.

The electric linear motor is preferably a three-phase asynchronous motor which permits high actuating forces and hence rapid movability of the tool with high precision.

The advantages of a three-phase asynchronous linear motor become particularly effective when the electric linear motor is regulated by flow-oriented current conduction. In this case, the set phase current values are calculated by the X-axis control system on the basis of the actuating variable.

The phase currents for the flow-oriented current conduction are expediently regulated by a pulse converter associated with the X-axis drive.

In another alternative embodiment for the X-axis drive, provision is made for the X-axis drive to comprise a hydraulic actuating cylinder, with the hydraulic actuating cylinder preferably being activated by a hydraulic servo valve. In this embodiment, for example, the actuating variable is the valve slide path and the speed of the X-axis drive results essentially therefrom.

In this case, the actuating signal calculated by the X-axis computer is preferably converted into a control signal for the hydraulic servo valve and not into set current values for the converter as with a three-phase asynchronous linear motor.

BRIEF DESCRIPTION OF THE DRAWINGS

Further features and advantages of the inventive machine are set forth in the following description and the appended drawings of several embodiments. The drawings show.

DETAILED DESCRIPTION OF THE INVENTION

Figure 1:
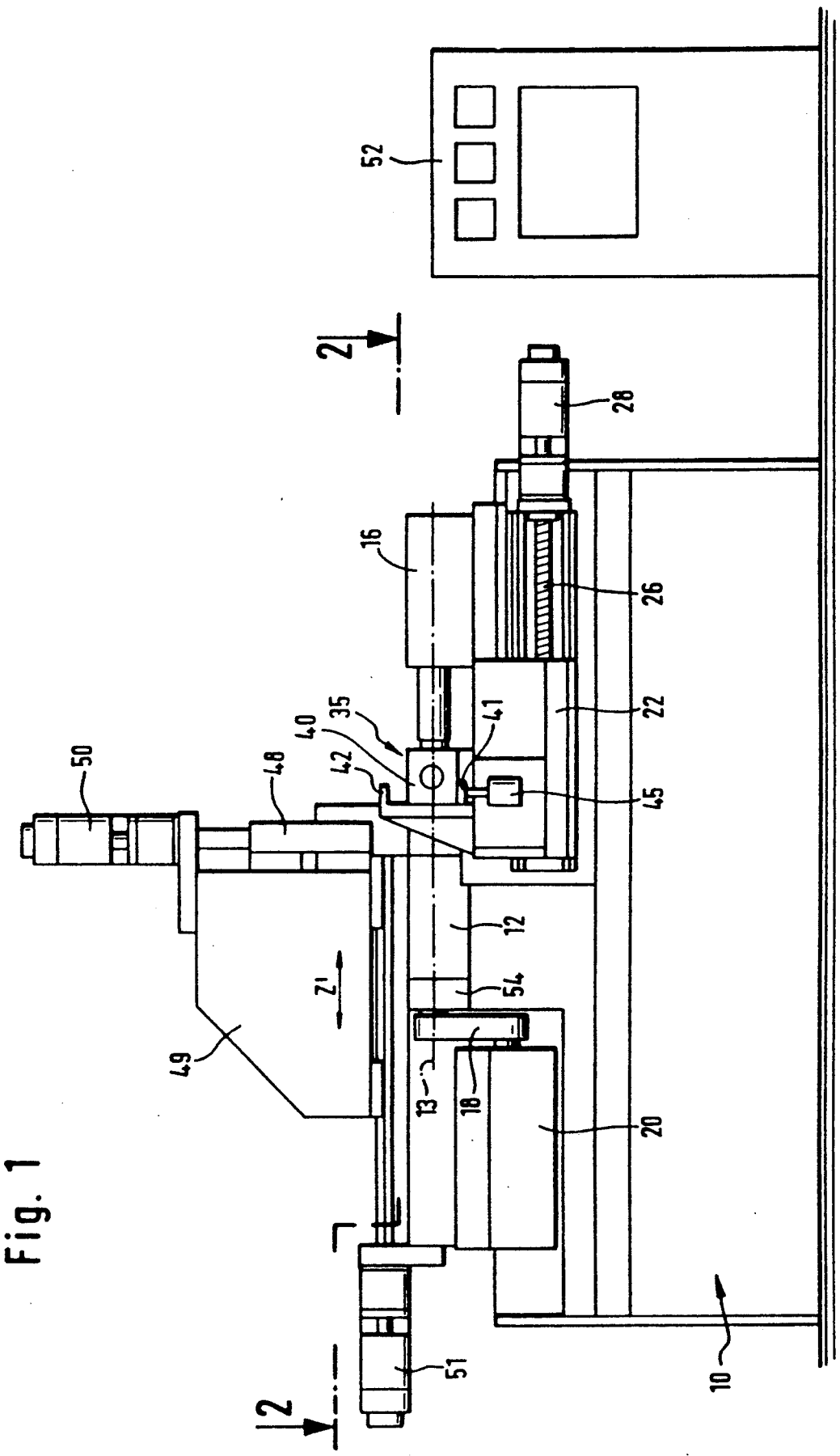
FIG. 1 a side view of an embodiment of an inventive machine.
Figure 2:
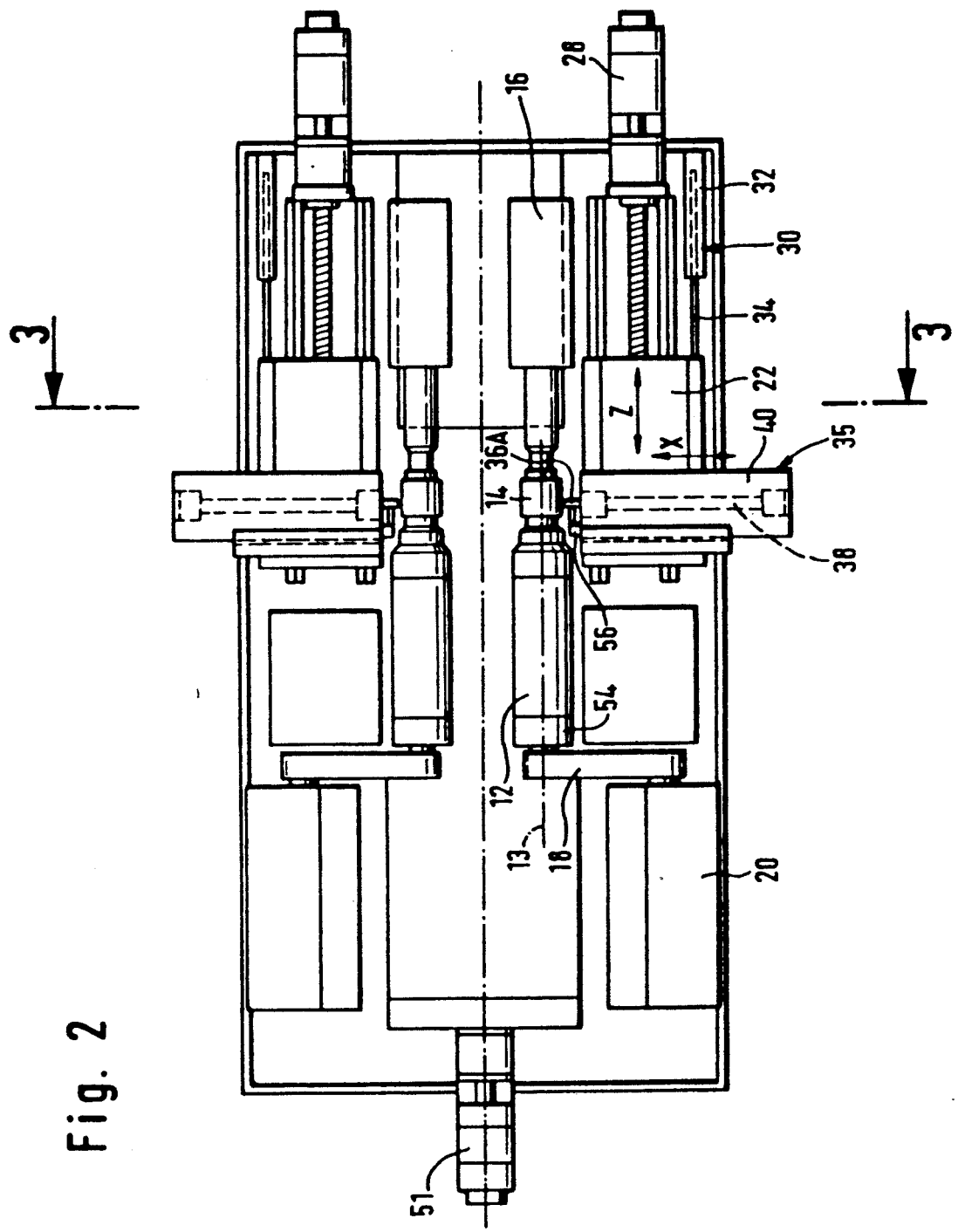
FIG. 2 a plan view along line 2—2 of the first embodiment.
Figure 3:
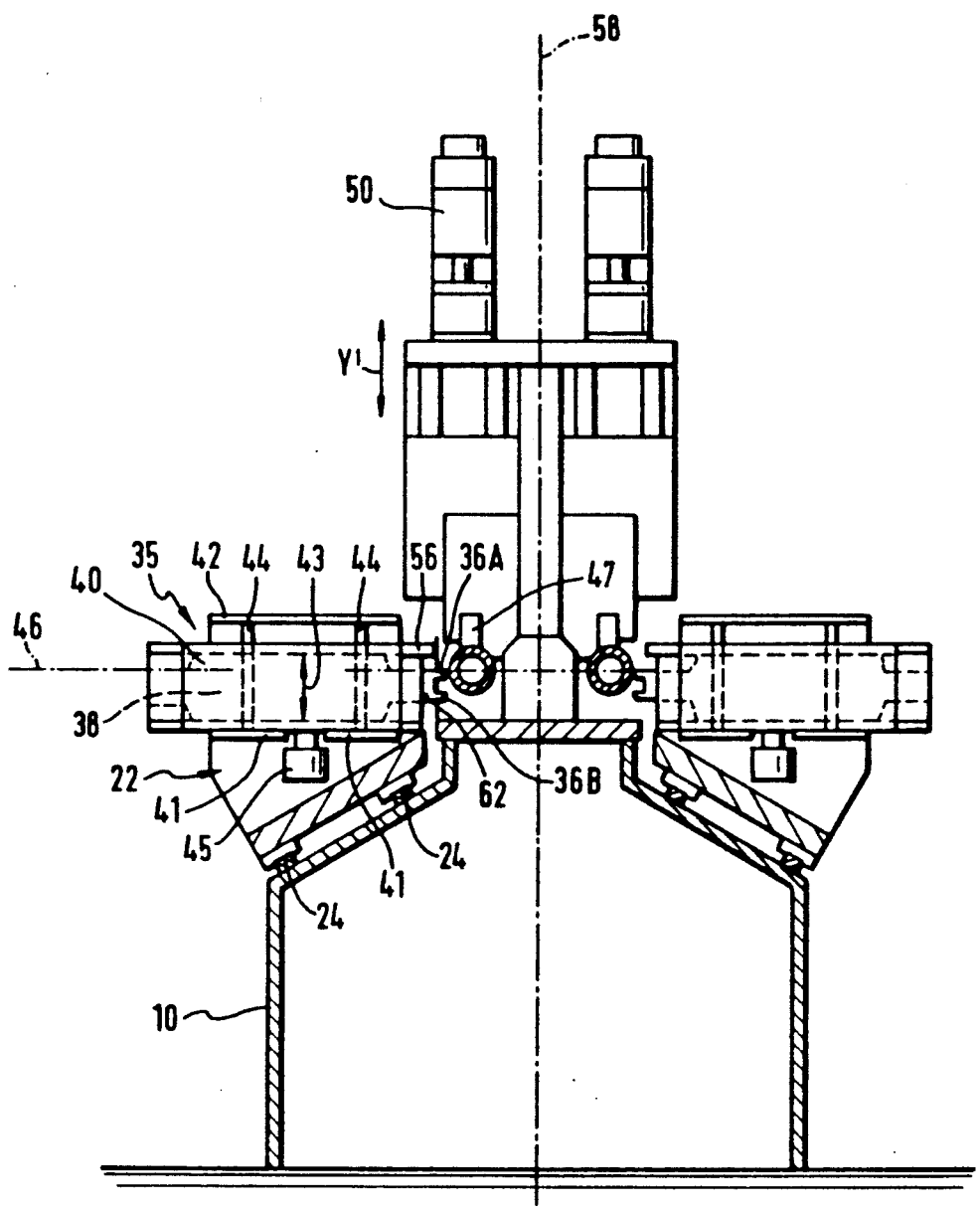
FIG. 3 a section along line 3—3 in FIG. 2.

A first embodiment of an inventive machine for the non-circular machining of pistons comprises, as illustrated in FIGS. 1 to 3, a machine frame designated in its entirety 10 on which a spindle 12 with an essentially horizontal spindle axis 13 is held. A piston 14 is clampable in the spindle 12 for turning. The piston 14 is held opposite the spindle 12 by a rotating clamping sleeve 16 likewise arranged on the machine frame 10 coaxially with the spindle 12. The spindle 12 is preferably driven via a driving belt 18 by a spindle motor 20 seated on the machine frame 10.

The spindle 12 and the clamping sleeve 16 are held stationarily on the machine frame 10 and the clamping sleeve 16 is hydraulically actuatable for clamping the piston 14.

For machining the piston 14 there is provided on the machine frame 10 a Z-slide 22 which is mounted on Z-guides 24 for displacement in the Z-direction parallel to the spindle axis 13. The Z-slide 22 is adjustable in a defined manner in the Z-direction by a ball-race spindle 26 driven by a Z-axis drive 28.

A Z-axis sensor 30 is provided for determining the position of the Z-slide 22 relative to the machine frame 10. The Z-axis sensor 30 preferably comprises a linear scale 34 which is optically scannable by a scanning unit 32.

On the Z-slide 22 there is provided an X-axis drive 35 comprising a tool carrier 38 in the form of a linear motor displaceable in an X-direction perpendicular to the Z-direction and hence perpendicular to the spindle axis 13 and preferably extending horizontally, and a linear displacement device 40 by means of which the tool carrier 38 is positionable in a controlled manner in the X-direction.

The tool carrier 38 displaceable in the X-direction carries—as described in detail hereinbelow—two tools 36A and 36B advanceable in the X-direction towards the piston 14. The entire arrangement of the tool carrier 38 with the linear displacement device 40 is described in detail hereinbelow. The tools 36A and 36B advanceable in the X-direction towards the piston 14 are for non-circular machining of the piston.

To enable the two tools 36A and 36B to be alternately brought into use, the linear displacement device 40 is movable in a tool changing direction 43 on displacement guides 44 between two stops 41 and 42 in the form of stop bars defining two stop positions. For this purpose, a drive 45 is provided for acting upon the linear displacement device 40 such that it rests either against the stop 41 in which case the piston 14 is machined with tool 36A or against the stop 42 in which case the piston 14 is machined with tool 36B.

The stops 41 and 42 are arranged such that the cutters of the tools 36A and 36B lie in the same cutting plane 46, preferably extending through the spindle axis 13, when the tools 36A and 36B are standing in their machining position.

For also machining piston ring grooves in the piston 14 in the same clamping thereof, there is provided, as illustrated in FIGS. 1 and 3, in a Y'-direction standing perpendicular on the X-direction and the Z-direction and on the spindle axis 13, a Y'-tool 47 which is held on a Y'-slide 48 mounted, for its part, for displacement on a Z'-slide 49 and positionable in the Y'-direction by a Y'-axis drive 50.

The Z'-slide 49, for its part, is mounted on the machine frame 10 for displacement in the Z'-direction extending parallel to the Z-direction and to the spindle axis 13 and is adjustable by a Z'-axis drive 51 in the Z'-direction. The Z'-slide is preferably arranged on that side of the piston 14 on which the spindle 12 lies and is seated above the spindle 12, and the Z'-axis drive 51 is seated on the side of the spindle motor 20 opposite the spindle 12.

For controlling the tool carrier 38 there is provided a control device designated in its entirety 52 which activates via the Z-axis sensor 30 the Z-axis drive 28 and hence the Z-slide 22 and activates the spindle 12 via the spindle motor 20 as rotational-angle-controlled C-axis, for which purpose there is provided coaxially with the spindle 12 and connected to the latter a rotational angle sensor 54 as C-axis sensor. Furthermore, the advance of the tool carrier 38 carrying the X-tools 36A, B is controlled via the linear displacement device 40, and an X-axis sensor 56 which determines the movements of the tool carrier 38 relative to the Z-slide 22 is provided for determining the movements of the tool carrier 38 in the X-direction.

The inventive device for the non-circular machining of pistons is, furthermore, preferably constructed symmetrically in relation to a center plane 58 and allows two pistons 14 to be machined simultaneously, with all of the above-mentioned parts except for the Z'-axis drive 50 and Z'-slide 46 being provided twice.

Figure 4:
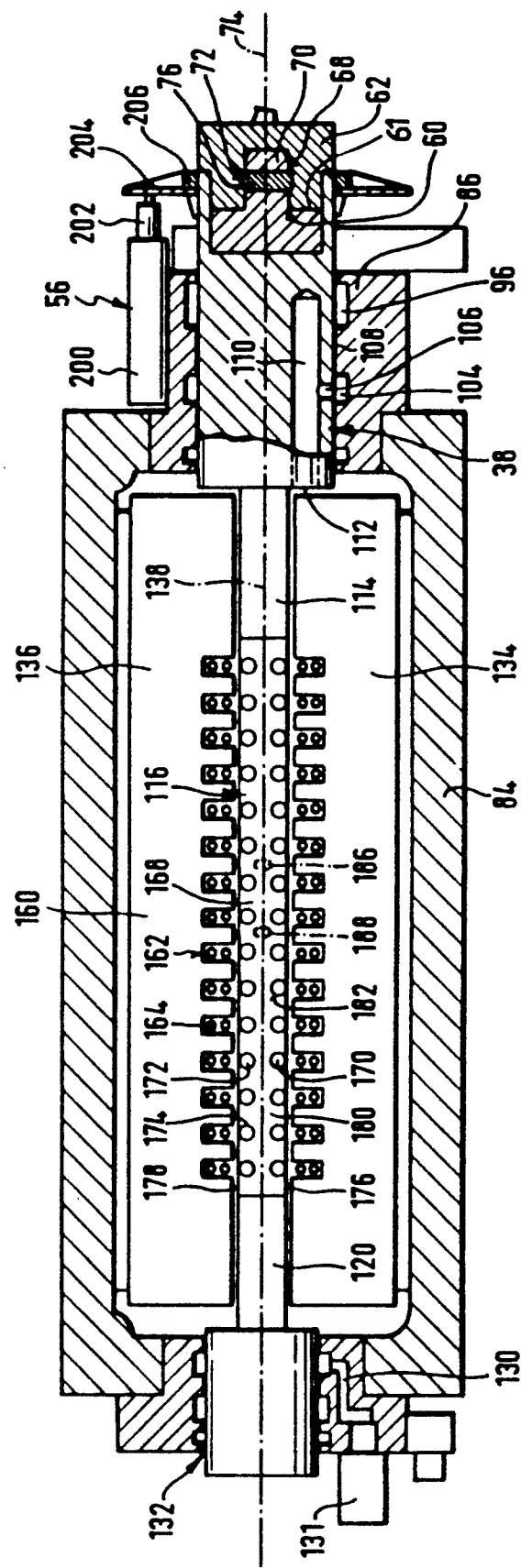
FIG. 4 a horizontal section through the X-axis drive of the first embodiment.
Figure 5:
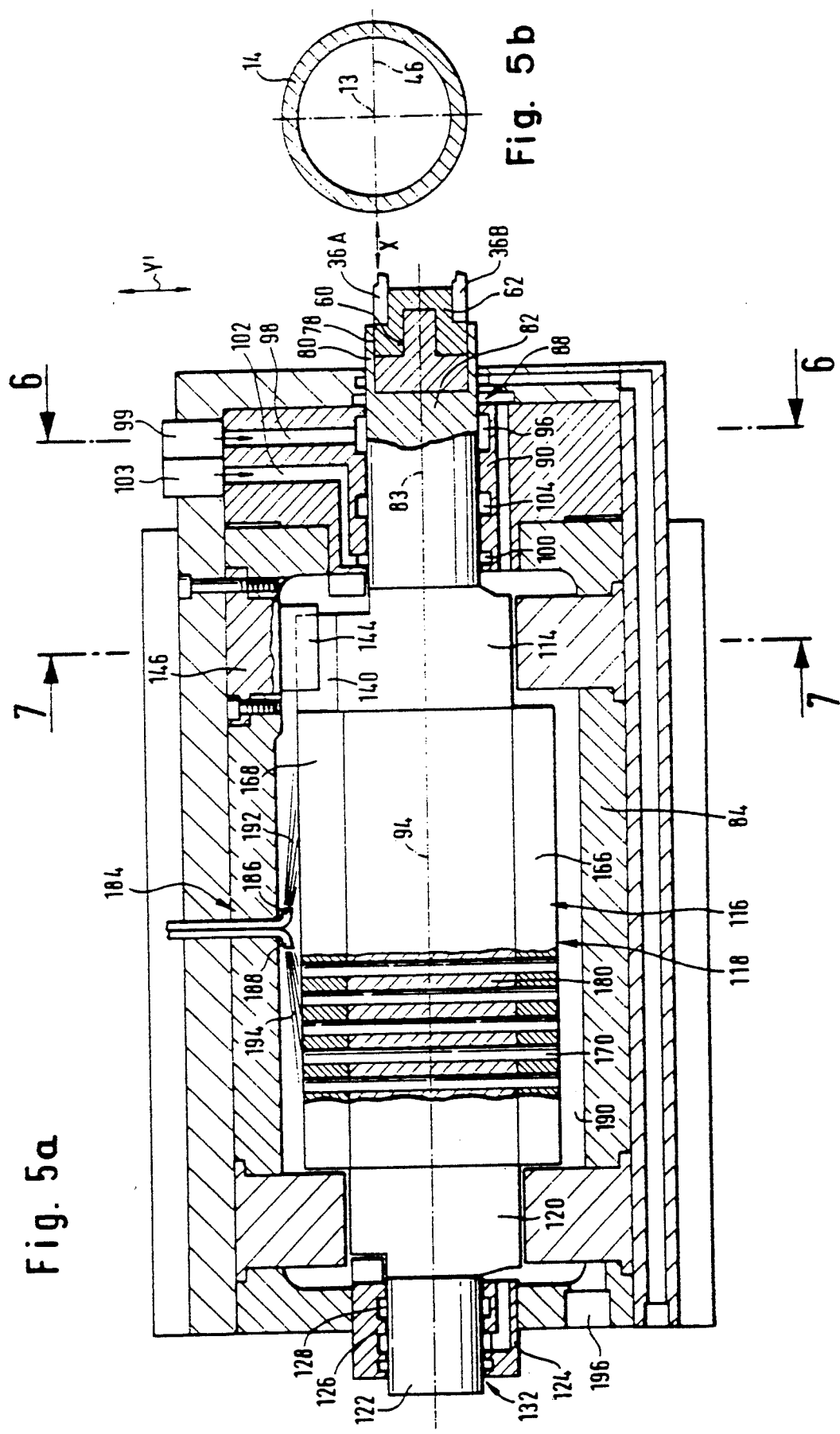
FIG. 5a a vertical section through the X-axis drive of the first embodiment.
FIG. 5b a cross section through a piston to be machined in accordance with the present invention.

The linear displacement device 40 with the tool carrier 38, illustrated on an enlarged scale in FIGS. 4 and 5, comprises a tool holder receiving means 60 in which a tool holder 62 can be inserted and placed against a gauged stop surface 61 of the tool holder receiving means 60. The tool holder 62 carries two tools 36A and 36B arranged one above the other in the Y'-direction. This tool holder 62 comprises a central bore 68 in which a centering pin 70 of the tool holder receiving means 60 is introducible. For clamping the tool holder 62, the central bore 68 is additionally provided with an annular groove 72 in which clamping wedges 76 of the tool holder receiving means 60 extending radially in relation to a pin axis 74 engage in order to clamp the tool holder 62 and position it against the gauged stop surface 61.

Furthermore, the tool holder 62 is surrounded on its outer side 78 facing the tool holder receiving means 60 by cylinder-segment-like enclosure members 80 of the tool holder receiving means 60.

The tool holder receiving means 60 is located immediately in front of a front cylindrical guiding body 82 of the tool carrier 38 which together with a front bearing brass 86 held on a housing 84 forms a front sliding bearing designated in its entirety 88.

Figure 6:
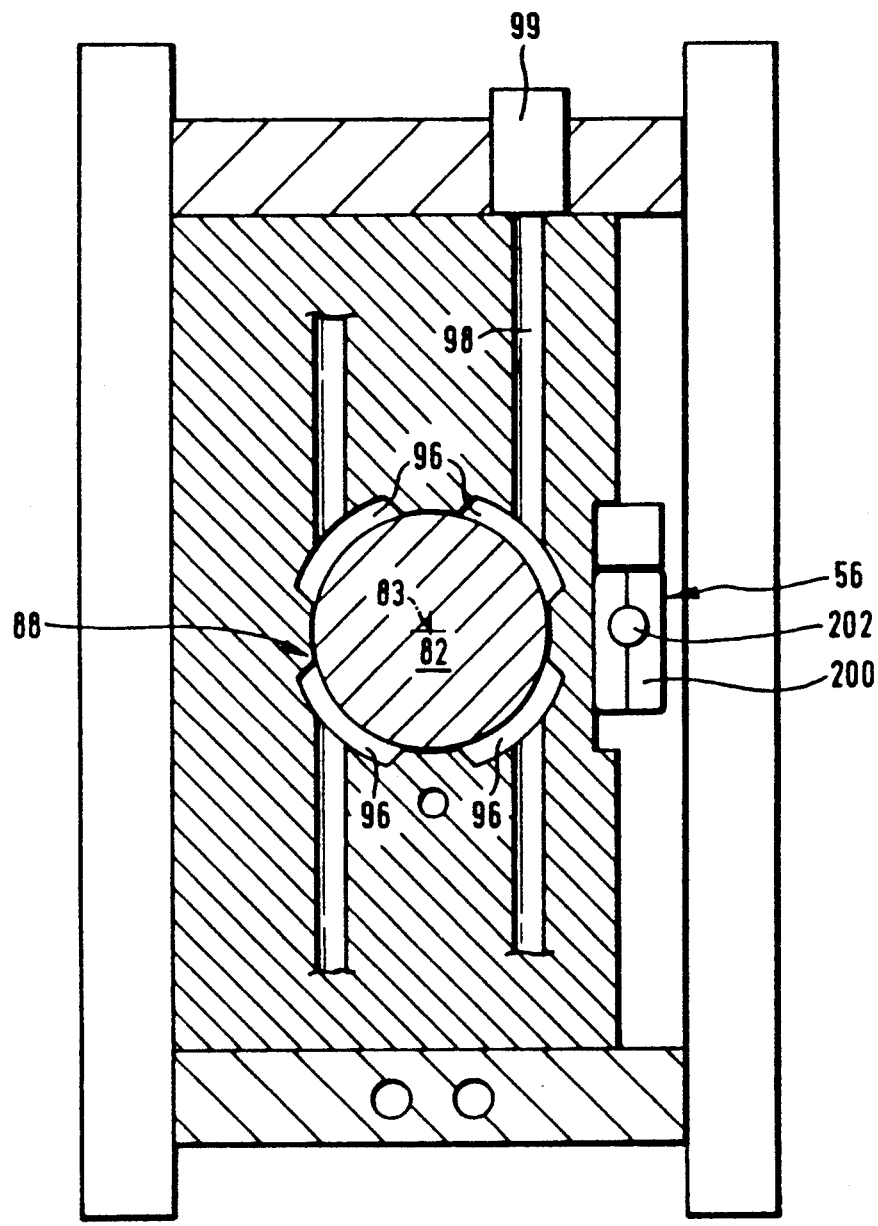
FIG. 6 a section along line 6—6 in FIG. 5.
Figure 7:
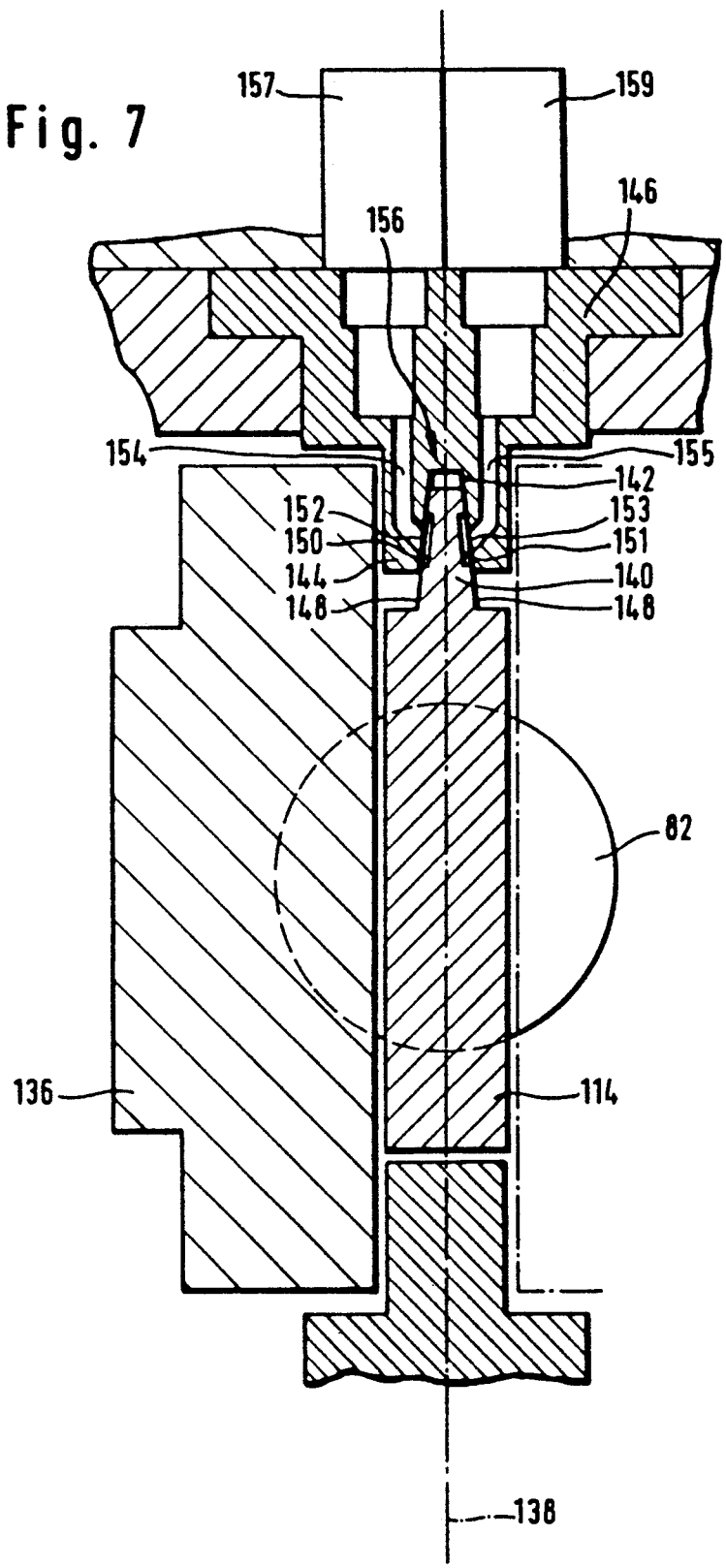
FIG. 7 a section along line 7—7 in FIG. 5.

This front sliding bearing 88 is in the form of a hydrostatic bearing and comprises, as illustrated in FIGS. 4, 5 and 6, a bearing ring 90 receiving the cylindrical, front guiding body 82 serving as sliding piece, with a cylinder axis 83 of the front guiding body 82 as guide and of the bearing ring 90 coinciding with a longitudinal axis 94 of the tool carrier 38.

The bearing ring 90 comprises, as illustrated in FIGS. 4, 5 and 6, front pressure pockets 96 arranged at an angular spacing from one another and extending over an angular area. These are each acted upon via a pressure line 98 of their own by pressure medium. There are also arranged in the bearing ring 90 at a spacing from the front pressure pockets 96 rear pressure pockets 100 which are each likewise acted upon via a pressure line 102 of their own by pressure medium. Between the front pressure pockets 96 and the rear pressure pockets 100 there is provided in the bearing ring 90 a collecting groove 104 which extends around the cylindrical, front guiding body 82 and is connected to a return flow bore 106 which extends from an outer circumferential surface 108 of the front guiding body 82 into the latter and opens into a return flow channel 110 extending in the front guiding body 82 parallel to the longitudinal axis 94 of the latter. This return flow channel 110 exits from the front guiding body 82 at a rear end face 112 facing away from the tool holder receiving means 60.

Adjoining the side of the front guiding body 82 opposite the tool holder receiving means 60 is a front intermediate piece 114 on which there is held on the side thereof opposite the front guiding body 82 a secondary part 116 of a linear motor designated in its entirety 118. This secondary part 116 is, in turn, held at its side opposite the front intermediate piece 114 on a rear intermediate piece 120. Adjoining the intermediate piece 120 is a rear guiding body 122 serving as sliding piece. The guiding body 122 is similarly of cylindrical shape coaxial with the longitudinal axis 94 and is held in a rear bearing brass 124 which, for its part, is provided with a bearing ring 126 surrounding the rear guiding body 122 serving as guide. The bearing ring 126 is likewise provided with four pressure pockets 128 arranged at an angular spacing and similarly extending over an angular area. The pressure pockets 128 are each acted upon via pressure lines 130 of their own by pressure medium.

Hence the pressure pockets 128 together with the bearing ring 126 and the rear guiding body 122 altogether form a rear sliding bearing 132.

Each single one of the pressure lines 98, 102 and 130 and hence each single one of the pressure pockets 96, 100 and 128 is supplied via a regulator of its own 99, 103 and 131 which regulates the flow through the pocket in accordance with the pocket pressure such that when the pocket pressure increases, there is a linear increase in the flow through the pocket.

The tool carrier 38 thus includes the rear bearing body 122, the intermediate piece 120, integrates the secondary part 116 of the linear motor 118, then continues in the intermediate piece 22 and the front guiding body 82 as far as the tool holder receiving means 60 and also comprises the exchangeable tool holder 62. The tool carrier 38 is guided by the front sliding bearing 88 and the rear sliding bearing 132, in particular their bearing brasses 86 and 124, on the housing 84.

This housing 84 also receives primary parts 134 and 136 of the linear motor 118. The primary part 134 and the primary part 136 enclose the secondary part 116 between them. The secondary part 116 comprises opposed surfaces which face the primary parts 134 and 136 and between which there lies parallel to these a center plane 138 which preferably stands perpendicular on the cutting plane 46. The two primary parts 134 and 136 extend essentially over the total distance between the sliding bearings 88 and 132 and engage in directions parallel to the center plane 138 over the secondary part 116, preferably between its bearing brasses 86 and 124, so that the intermediate pieces 120 which do not belong to the secondary part 116 extend in between the primary parts 134 and 136 and preferably have perpendicular to the center plane 138 lying between the primary parts 134 and 136 the same thickness as the secondary part 116.

To secure the tool carrier 38 against rotation and support the torque thereof, the front intermediate piece 114 is provided with a wedge 140 extending symmetrically in relation to the center plane 138 lying between the two primary parts 134 and 136. The wedge 140 likewise lies between the primary parts 134 and 136 and extends in a wedge groove 142 which is machined in a nose 144 projecting between the primary parts 134 and 136. The nose 144 is part of a filler piece 146 which, for its part, is held on the housing 84.

Both wedge surfaces 148 of the wedge 140 are provided with oil pockets 150, 151. Arranged opposite these are openings 152, 153 of pressure conduits 154, 155 which are led through the filler piece 146 and the nose 144 and through which pressure medium is introduced into the oil pockets 150, 151 so that the wedge 140 is guided free of play symmetrically in relation to the center plane 138 in the wedge groove 142.

Each of the pressure conduits 154 and 155 is provided with a regulator of its own 157, 159 which controls the pressure in and the flow through the oil pockets 150, 151 in such a way that when the pressure increases, there is a linear increase in the flow through the pockets.

Hence, on the one hand, the tool carrier 38 is guided in the sliding bearings 88 and 132 for receiving forces acting through the tools 36A or 36B transversely to the longitudinal axis 94, with the sliding bearing 88 receiving the largest of such forces, and, on the other hand, it is also secured against rotations about the longitudinal axis 94 by a rotation preventing means 156 formed by the wedge 140 and the wedge groove 142.

The linear motor 118 is preferably in the form of a three-phase asynchronous linear motor, preferably a double-comb-type linear motor in which the two primary parts 134 and 136 are each comprised of an iron core 160 comprising grooves 162 facing the secondary part 116 and extending parallel to the center plane 138 transversely over the entire width of the secondary part 116. The exciting windings 164 lie in the grooves 162.

The secondary part 116 is, furthermore, provided with short circuit windings which comprise outer copper rods 166 and 168 extending on both sides of the secondary part 116 and parallel to the longitudinal axis 94 over the entire length of the secondary part 116. The copper rods 166 and 168 lie symmetrical in relation to the center plane 138 and extend over the entire thickness of the secondary part 116 perpendicular to the center plane 138. These outer copper rods 166 and 168 are electrically conductively connected by copper rods 170 and 172 extending parallel to the grooves 162 and hence parallel to the center plane 138 and perpendicular to the longitudinal axis 94. The copper rods 170 and 172 are each arranged in planes lying parallel to the center plane 138 such that with their outer circumferential surface 174 they reach as far as the respective surface 176 and 178, respectively, of the secondary part 116, but are spaced from one another perpendicular to the center plane 138.

The outer copper rods 166 and 168 and the copper rods 170 and 172 are preferably held on a carrier body 180 of the secondary part 116 which forms an iron core. The carrier body 180 itself has the same thickness as the outer copper rods 166 and 168 perpendicular to the center plane 138 and extends between these. This carrier body 180 is provided with bores 182 in which the copper rods 170 and 172 lie.

To avoid deformations of the secondary part 116 by non-uniform temperature within the latter, a tempering means 184 is provided for it. This advantageously comprises oil showers 186, 188 which are arranged above the secondary part 116 and shower the latter with oil which runs off over the secondary part 116 into a pan 190 located below the secondary part 116. In order for this to take place as uniformly as possible, the oil showers 186 and 188 are arranged approximately at the center of the secondary part 116 and distribute the oil in opposite directions parallel to the longitudinal axis 94 of the secondary part 116. The shower jets 192 and 194 thereof strike the top copper rod 168.

The oil used for the hydrostatic sliding bearings 88 and 132 is preferably used as oil for the oil shower so that the oil running out of these sliding bearings 88, 132 can be conducted in a simple way into the pan 190, for example, via the return flow conduit 110 and starting from there can be used again. The oil return flow conduit 196 discharging into the oil pan 190 serves this purpose.

The three-phase asynchronous linear motor 118 operates such that a magnetic travelling field is generated by exciting windings 164 and currents are induced by its change with respect to time and space in the grid formed by the copper rods. These currents, for their part, bring about a magnetic counter travelling field which interacts with the field generated by the exciting windings 164 and hence results in sliding movement of the tool carrier 38 in the X-direction. The travelling field in the exciting winding is generated with the aid of the field-oriented flow conduction and the pulse converter such that the force predetermined for the field-oriented flow conduction acts practically without delay on the secondary part.

For determining the displacement of the tool carrier 38 relative to the Z-slide 22, the X-axis sensor 56 is held —as illustrated in FIG. 4—on the housing 84 which, for its part, is mounted on the Z-slide 22 for non-displacement in the X-direction. The X-axis sensor 56 is mounted with a stationary part 200 on the front bearing brass 86, while a movable part 202 of the same is fixedly connected to a stiffened arm 204 which, for its part, is held on a ring 206 surrounding the enclosure members 80 and connected to the latter. Hence the arm 204 directly engages the tool holder receiving means 60 and thus in the immediate vicinity of the tool holder 62 so as to eliminate any changes in length of the other parts of the tool carrier 38.

The X-axis sensor 56 is preferably an optical length sensor, with the movable part 202 being an optically readable linear scale.

Figure 8:
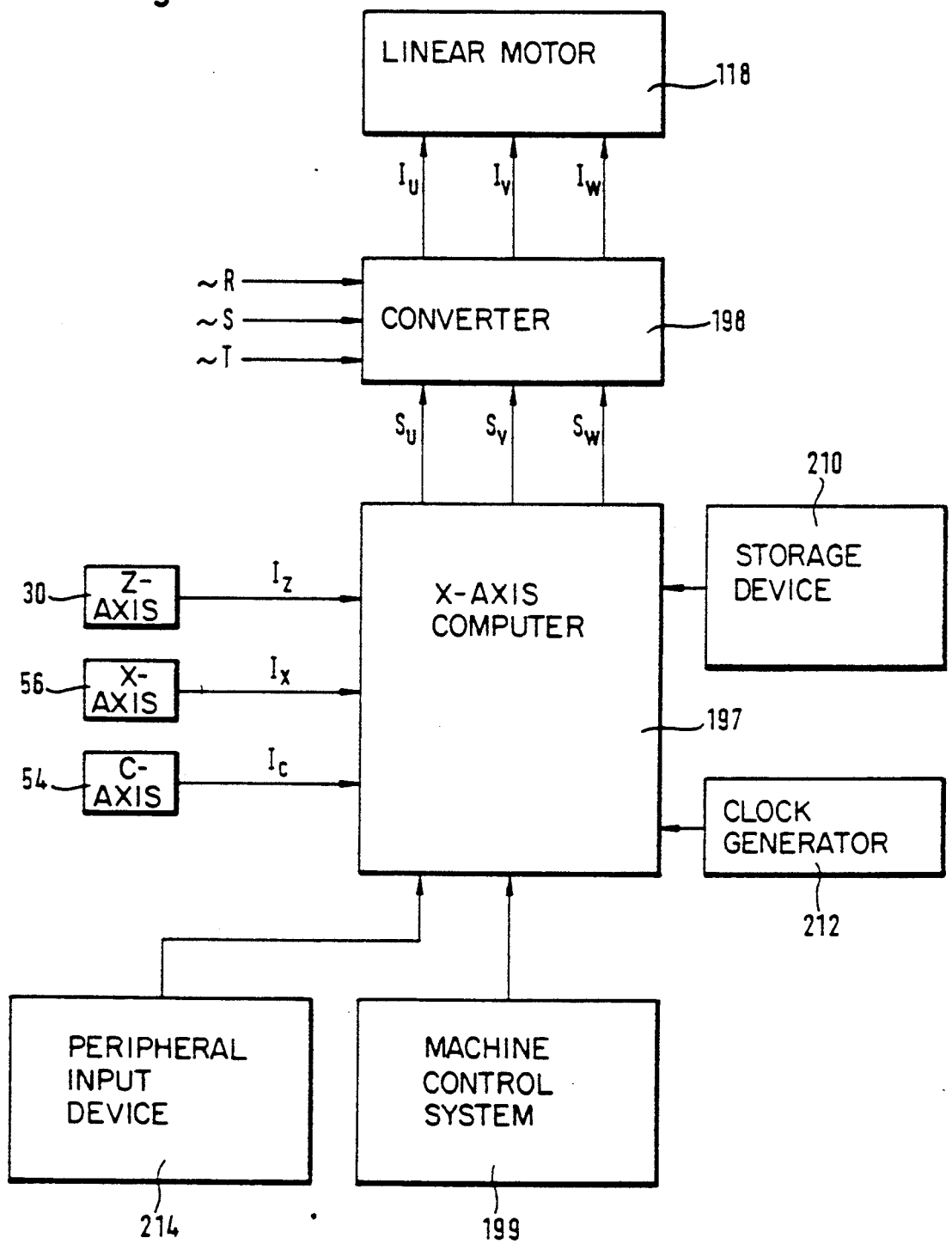
FIG. 8 a schematic illustration of the control device of the first embodiment.

For activating the three-phase asynchronous linear motor 118, the control device 52 comprises, as illustrated schematically in FIG. 8, an X-axis computer 197 which acquires the Iz value measured by the Z-axis sensor 30, the Ix value measured by the X-axis sensor 56 and the Ic value measured by the C-axis sensor 54. With these values, the X-axis computer 197 calculates set current values Su, Sv, Sw which a converter 198 using three-phase current with the phases R, S, T from the mains converts into three-phase current with the individual currents Iu, Iv and Iw with which the exciting windings 164 of the primary parts 134 and 136 are then powered.

Further details relating to the features, activation and function of such an asynchronous linear motor are discussed at length in the magazine "Werkstattstechnik" (Workshop Technology) 79 (1989), pages 647 to 650, to the contents of which reference is made in full.

The X-axis computer 197 represents only one part of the control device 52 which controls the entire machine according to the invention. This control device 52 comprises in addition to the X-axis computer 197 a machine control system 199 which controls the spindle 12 operated as C-axis and the Z-axis drive 28 and also other machine functions in a conventional manner. Only the X-axis control is excepted from the machine control system 199 and shifted to the X-axis computer 197.

In order to store a contour of the piston 14 to be machined, a storage device 210 is directly associated with the X-axis computer 197. Furthermore, the X-axis computer 197 is operated by an integrated clock generator 212 whose function and task will be explained in detail hereinbelow.

To enable storing of the contour of the piston 14 to be machined in the storage device 210 associated with the X-axis computer 197, a peripheral input device 214 is advantageously also provided. In the simplest case, this is a PC. The peripheral input device 214 can, however, also be a further computer of substantially more elaborate design.

As an alternative to this, it is also conceivable to enter the contour via the machine control system 199.

Figure 9:
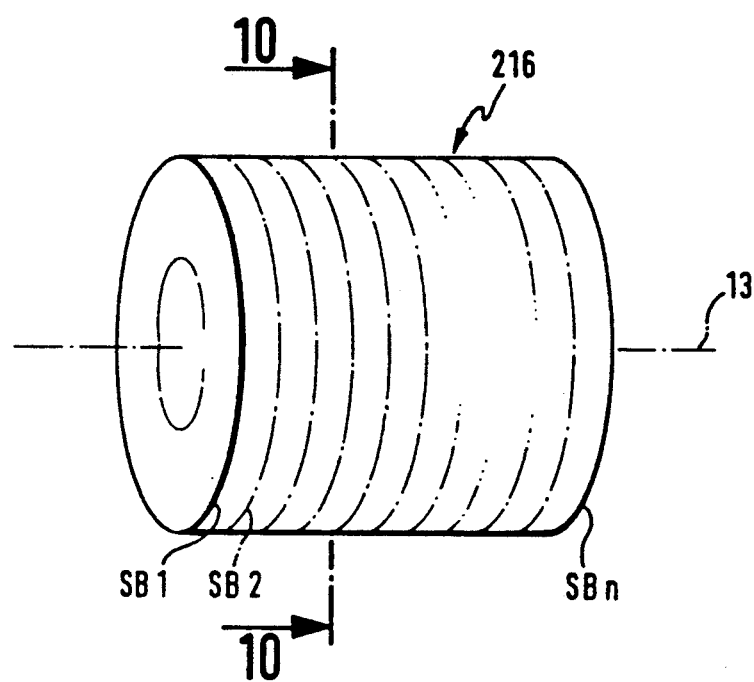
FIG. 9 a schematic illustration of the way in which a contour is stored in the first embodiment.
Figure 10:
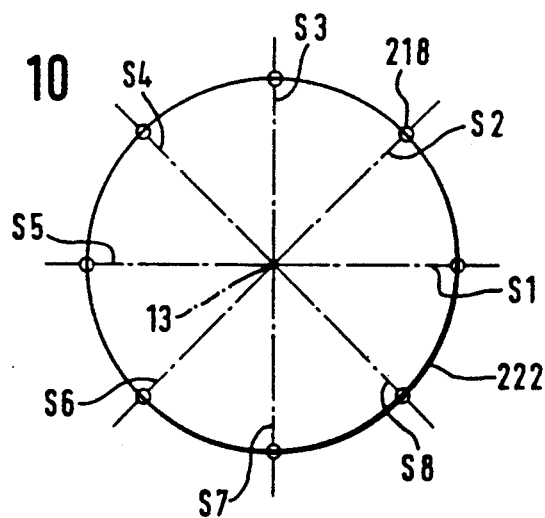
FIG. 10 a section along line 10—10 in FIG. 9.

The contour 216 according to which the piston 14 is to be machined is illustrated in FIGS. 9 and 10. The contour 216 is divided up into individual discs SB1 to SBn arranged coaxially with the spindle axis 13 and equidistantly in relation to one another. As illustrated in FIG. 10, each disc SB is represented by a series of, for reasons of simplicity, eight support points S1 to S8 shown in the drawing. These each represent the radial spacing of a point 218 on a circumferential surface 222 of the contour 216 from the spindle axis 13. The individual points 218 are arranged at identical angular spacings of 45° relative to one another around the spindle axis 13 as illustrated in FIG. 10. Hence eight support points S1 to S8 belong to each of the discs SB1 to SBn.

During machining of a piston 14 on the inventive machine, the C-axis drive 20 is activated by the machine control system 199 such that it turns at a constant speed. The Z-axis drive 28 is activated at a constant advancing speed in the Z-direction by the machine control system 199. The tool 36 is operation thus describes with its tip a spiral track on the circumferential surface 22 of the piston 14.

The X-axis control system 197 determines the positions of the C- and Z-axes at certain points in time. The point represented thereby on the circumferential surface 222 lies, as a rule, between two discs SB, for example, SB2 and SB3, and also between two support points S, for example, S4 and S5. The set X-value belonging to this point can be calculated by two-dimensional, linear or higher interpolation procedures from the surrounding four support points, for example, S4 and S5 of SB2 and S4 and S5 of SB3.

The number of support points S and discs SB can be optionally selected by an operator when entering the same. The necessary number depends on the geometry of the workpiece, the desired accuracy and the type of interpolation. The support point density can differ in partial areas of the piston 14.

For exact activation of the tool 36 standing in the cutting plane 46, it is positioned with the linear displacement device 40 such that at each point on the circumferential surface 222, defined by the interpolated values, it stands in exactly a position corresponding to the circumferential surface 222.

Owing to the division of the contour 216 into discs SB1 to SBn and support points S1 to S8, in order to exactly calculate each point on the circumferential surface 222, interpolation is necessary between the support points S1 to S8 of a disc in order to determine an external shape of each disc and interpolation is also necessary between the equidistantly spaced discs SB in order to carry out an interpolation between the individual external shapes of the individual discs SB so that any chosen point on the circumferential surface 222 fixable by a C-position value C (K) and a Z-position value Z (K) is defined by a set value W (K) which indicates the spacing of the circumferential surface 222 in the X-direction from the spindle axis 13.

Since the activation of the C-axis and the Z-axis is carried out via the machine control system 199 and the X-axis computer 197 is started by the clock generator 212 issuing clock pulses at constant time intervals ΔT and after each start a calculation routine designated K is carried out at a point in time K·ΔT to determine an actuating power U (K), in order to determine the set value W (K), the corresponding C-position value C (K) and the corresponding Z-position value Z (K) have to be determined for the point in time K·(ΔT) and with these position values C (K) and Z (K) the interpolation has to be carried out between those support points S and discs SB which are relevant.

Figure 11:
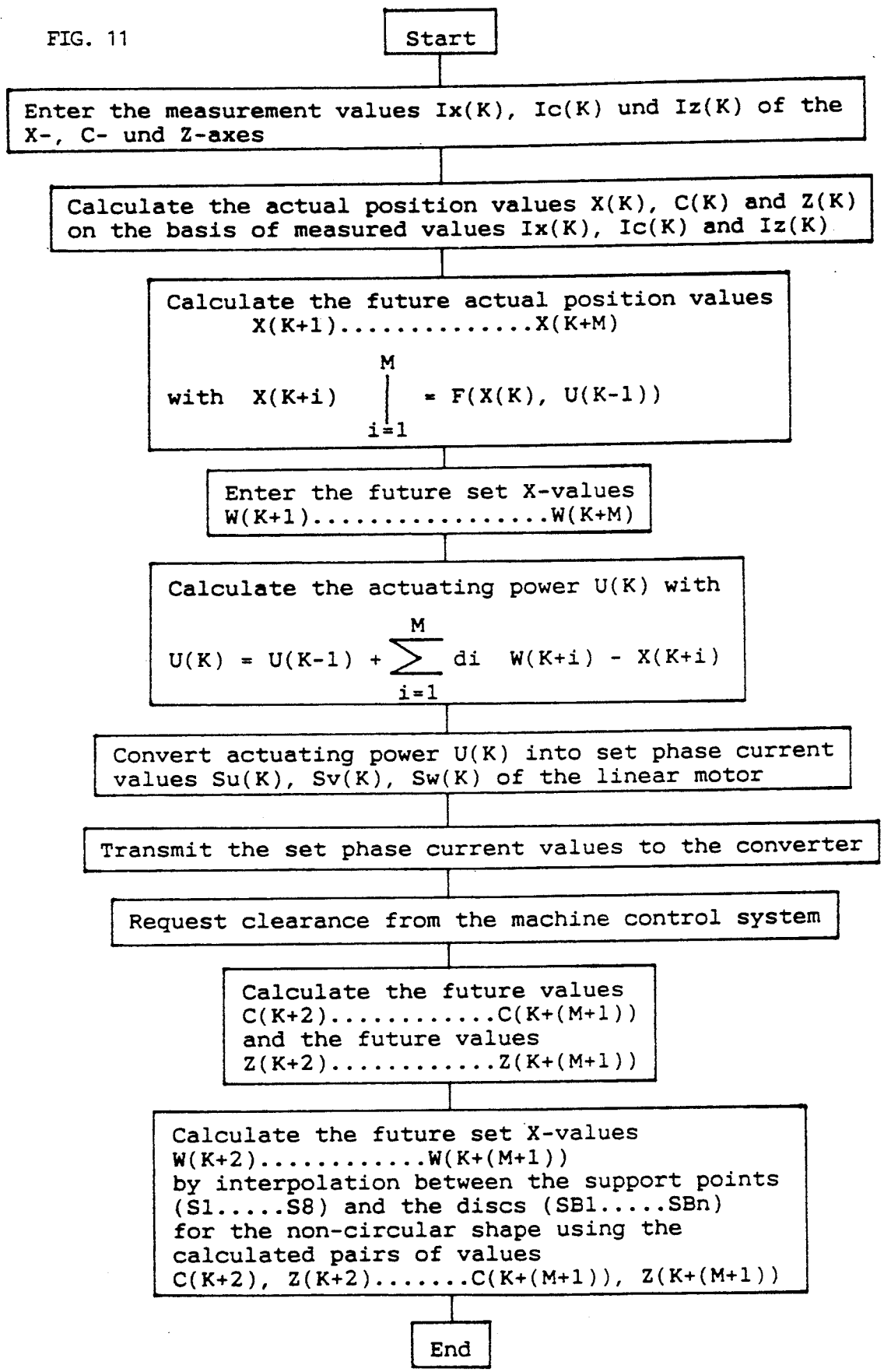
FIG. 11 a sequence of a calculation routine in the first embodiment.

A preferred embodiment of such a calculation routine is illustrated in FIG. 11. According to this Kth calculation routine illustrated in FIG. 11 for the point in time K·(ΔT), the X-axis computer 197 first enters the measured values Ix (K), Ic (K) and Iz (K) from the respective sensors 56, 54 and 30 after it has been started by the clock generator 212.

The actual position values X (K), C (K) and Z (K) result from these measured values.

With the measured actual position value X (K), future actual position values X (K+1) to X (K+M) are calculated and, as such, these belong to later calculation routines (K+1) to (K+M). A special calculating procedure referred to as prediction of future actual position values is used for this. These future actual position values X (K+1) to X (K+M) are a function of the measured actual position value X (K) and the actuating power U (K−1) from the previous calculation routine.

The future set values W (K+1) to W (K+M) determined by interpolation in the previous calculation routine are then put to use. Details of how they are calculated will be given hereinbelow.

The actuating power U (K) of the Kth calculation routine is then calculated in accordance with a predictive rule algorithm. An embodiment of a predictive controller is described in the article "Hochgenaue Bahnbewegungen an Fertigungseinrichtungen" (Highly precise path movements in production devices) in Werkstattstechnik (Workshop Technology) 80 (1990), pages 383 to 386.

After calculation of the actuating power U (K), this actuating power is converted into set phase current values Su (K), Sv (K) and Sw (K) for the linear motor 118 which are of such dimensions that the linear motor 118 acts with the corresponding actuating power in the X-direction on the tool 36.

These calculated set phase current values Su (K), Sv (K) and Sw (K) of the linear motor are then transferred to the converter 198 which—as described hereinabove—provides corresponding phase currents Iu, Iv and Iw in the exciting windings 164 of the primary parts 134 and 136.

After the actual actuating function has been carried out, in the calculation routine clearance is requested from the machine control system 199 for a further calculation routine. If the machine control system 199 gives clearance for a further calculation routine, then in the Kth calculation routine, calculation of the future C-position values C (K+2) to C (K+M+1) and of the future Z-position values Z (K+2) to Z (K+M+1) is carried out with the measured actual values C (K) and Z (K) and the actual values C (K-1) and Z (K-1) measured in the previous calculation routine. Formulated in general:

$$C(K+1) = C(K) + i[C(K) - C(K-1)]$$

$$Z(K+i) = Z(K) + i[Z(K) - Z(K-1)]$$

$$i = 2 - M + 1$$

With these future C- and Z-position values, calculation of the future set values W (K+2) to W (K+M+1) is carried out by interpolation between the corresponding support points S1 to S8 and the discs SB1 to SBn for the non-circular shape or contour 216.

These calculated future set values W (K+2) to W (K+M+1) are restored by the X-axis computer 197 as follows:

$$W(K+i) = W(K+i-1).$$

Hence these future set values W can be used in the (K+1) calculation routine as future set values.

In the calculation routine for the actuating power U (K) illustrated by way of example in FIG. 11, all of the calculating operations which are not based on the measured actual position values X (K), C (K) and Z (K) are carried out in the previous calculation routine in order that after entry of the measured values Ix (K), Ic (K) and Iz (K) the set phase current values Su (K), Sv (K) and Sw (K) can be determined as quickly as possible, with Sw (K) being precisely defined by Su (K) and Sv (K) so that the time interval between the measuring of the actual position values X (K), C (K) and Z (K) and the issuing of the set phase current values Su (K), Sv (K) and Sw (K) is kept as short as possible in order to obtain as high control quality as possible.

Furthermore, owing to use of a predictive control, it is ensured that all lag errors of the linear displacement device 40 are taken into account and hence at the respective point in time K·(ΔT) the tool 36 lying in the cutting plane 46 precisely assumes the X-position predetermined by the contour 216.

Figure 12:
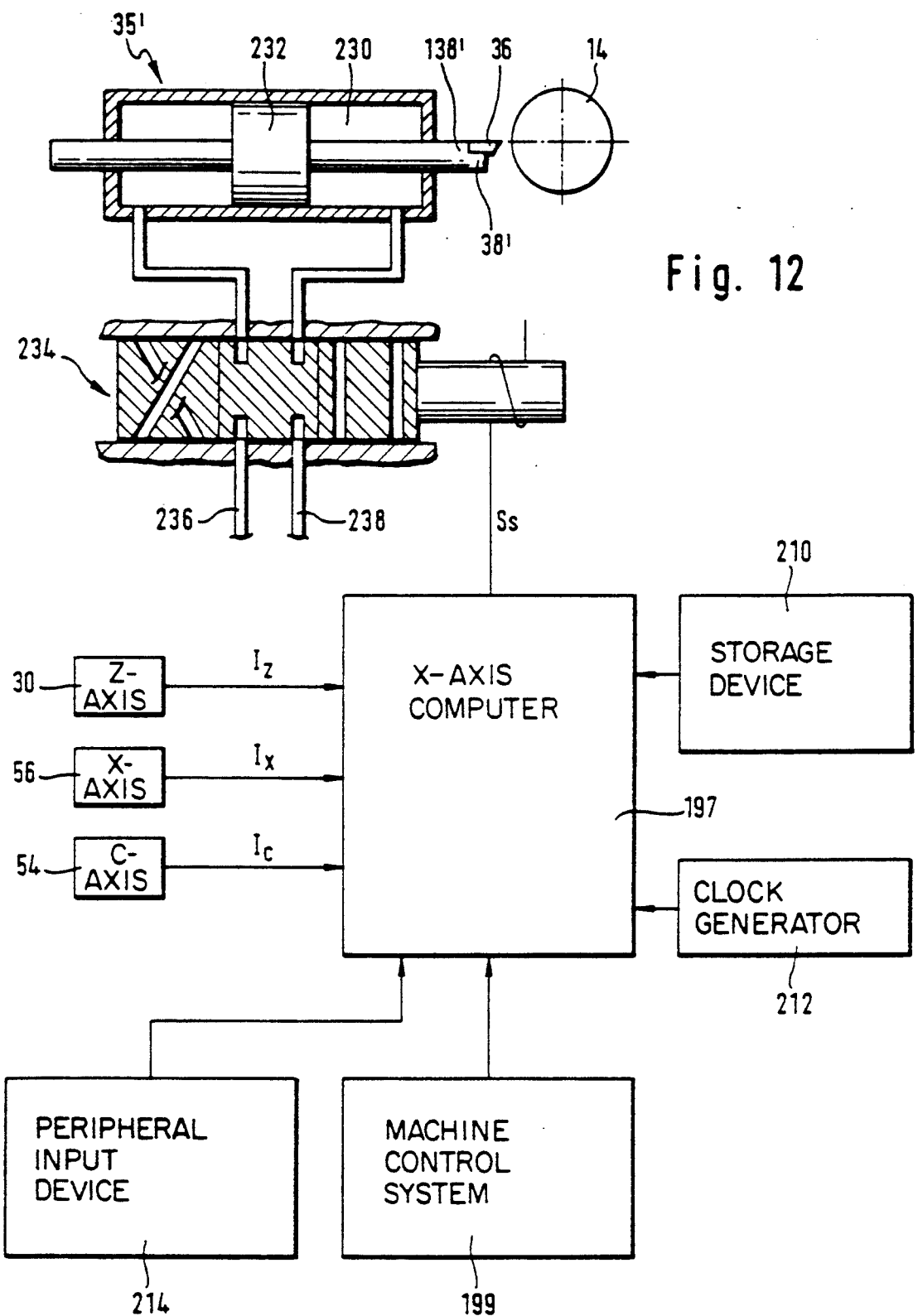
FIG. 12 a schematic illustration of a control device of a second embodiment.

In a second embodiment of the inventive machine, illustrated schematically in FIG. 12, the X-axis drive 35' comprises instead of the linear motor 118 an actuating cylinder 230 with a piston 232 which, for its part, is fixedly connected to a piston rod forming a tool carrier 138'. This tool carrier 38', in turn, carries in a known manner the tool 36 for machining the piston 14.

The actuating cylinder 230 is activated by a servo valve 234 which controls the supply of hydraulic medium from a pressure line 236 to the actuating cylinder 230 and, in addition, connects a return flow line 238 in a corresponding manner to the actuating cylinder 230.

The servo valve 234, for its part, is activated by a control signal Ss which is issued by the X-axis computer 197. Hence in contrast with the first embodiment, the X-axis computer 197 instead of the converter 198 is connected to the servo valve 234 and controls it in accordance with the calculated actuating variable which is calculated in the same way as in the previous embodiment.

The present disclosure relates to the subject matter disclosed in German application No. P 40 31 079.5 of Oct. 2, 1990, the entire specification of which is incorporated herein by reference.

What is claimed is:

1. A machine for the non-circular machining of workpieces comprising:
   a machine frame;
   a workpiece spindle held on said machine frame for receiving a workpiece;
   a C-axis sensor for determining rotary positions of said workpiece spindle;
   a Z-slide arranged on said machine frame for displacement in a Z-direction parallel to said workpiece spindle and having a Z-axis drive;
   a Z-axis sensor for determining a position of said Z-slide;
   an X-axis drive arranged on said Z-slide for advancing a tool in an X-direction towards said workpiece;
   an X-axis sensor for determining a position of said tool; and
   a control device for activating said X-axis drive to produce a predetermined non-circular workpiece shape;
   said control device comprising a numerical machine control system for activating said workpiece spindle and said Z-axis drive;
   said control device further comprising a numerical X-axis control system for activating said X-axis drive independently of said numerical machine control system via successive actuating variables;
   said numerical X-axis control system calculating said successive actuating variables in successive calculation routines on the basis of (i) actual position values measured by said C-axis sensor, (ii) actual position values measured by said X-axis sensor, and (iii) stored data defining said predetermined non-circular shape;
   said numerical machine control system and said numerical X-axis control system being coordinated after a predetermined number of calculation routines.

2. A machine as defined in claim 1, wherein said numerical X-axis control system controls said X-axis drive in response to a further actual value measured by said Z-axis sensor and determined by said numerical X-axis control system.

3. A machine as defined in claim 1, wherein said numerical X-axis control system activates said X-axis drive via an actuating variable in response to actual X-position values of said tool determined by said numerical X-axis control system.

4. A machine as defined in claim 1, wherein a clock generator is integrated in said numerical X-axis control system, said clock generator starting a calculation routine at discrete points in time after expiration of a fixable time interval, said calculation routine determining an actuating signal for said X-axis drive.

5. A machine as defined in claim 4, wherein said actuating signal is a signal issued by said calculation routine at said discrete points in time.

6. A machine as defined in claim 4, wherein said numerical X-axis control system carries out predetermined operations one after the other in said calculation routine, and after completion of said predetermined operations waits for said clock generator to start said calculation routine again.

7. A machine as defined in claim 6, wherein said actuating variable is calculated on the basis of actual position values and set position values.

8. A machine as defined in claim 7, wherein said actuating signal is determined on the basis of future actual position values calculated in advance and future set position values calculated in advance.

9. A machine as defined in claim 8, wherein said X-axis control system determines one of a future set X-position values by calculating a future actual C-position value and a future actual Z-position value.

10. A machine as defined in claim 9, wherein said numerical X-axis control system determines a predetermined number of future set X-position values and uses these to calculate an actuating signal at a certain point in time.

11. A machine as defined in claim 10, wherein said future set X-position values for a calculation routine are set X-position values for a predeterminable number of following calculation routines.

12. A machine as defined in claim 8, wherein the calculation of a future set X-position values is carried out by said numerical X-axis control system prior to entering actual position values associated with a certain point in time.

13. A machine as defined in claim 8, wherein future set X-position values for a calculation routine are calculated in a previous calculation routine.

14. A machine as defined in claim 8, wherein the future actual position values calculated in advance are used in a calculation routine and are calculated on the basis of an actual X-position value determined by the calculation routine.

15. A machine as defined in claim 14, wherein the advance calculation of future actual X-position values in a second calculation routine includes the actuating signal at the point in time of a previous first calculation routine.

16. A machine as defined in claim 14, wherein future actual X-position values calculated in advance and used in said calculation routine comprise the actual position values for a certain number of following calculation routines, and the actuating signal is determined by said calculation routine using said future actual X-position values.

17. A machine as defined in claim 1, wherein a storage device for contour values is associated with said numerical X-axis control system for storing parameters for the non-circular shape of said workpiece.

18. A machine as defined in claim 17, wherein said numerical X-axis control system determines set X-position values from actual C- and Z-position values and said parameters stored in said storage device.

19. A machine as defined in claim 18, wherein said parameters for the non-circular shape are stored in said storage device as radii support points for successive discs of said workpiece.

20. A machine as defined in claim 19, wherein said numerical X-axis control system interpolates between said radii support points of a disc.

21. A machine as defined in claim 19, wherein said numerical X-axis control system interpolates between said radii support points of successive discs.

22. A machine as defined in claim 1, wherein said numerical X-axis control system requests a clearance signal from said numerical machine control system.

23. A machine as defined in claim 22, wherein said clearance signal is requested outside of a time range between the entry of sensor values from at least one of said C-axis, Z-axis, and X-axis sensors for calculation of one of said actuating variables and the issuing of the respective actuating variable.

24. A machine as defined in claim 22, wherein said clearance signal for a calculation routine is requested during a previous calculation routine.

25. A machine as defined in claim 1, wherein said X-axis drive comprises an electric linear motor.

26. A machine as defined in claim 25, wherein said electric linear motor is a three-phase asynchronous linear motor.

27. A machine as defined in claim 26, wherein said electric motor is regulated by flow-oriented current conduction.

28. A machine as defined in claim 27, wherein said flow-oriented current conduction is controlled by a pulse converter associated with said X-axis drive.

29. A machine as defined in claim 1, wherein said X-axis drive comprises a hydraulic actuating cylinder.

30. A machine as defined in claim 29, wherein said hydraulic actuating cylinder is activated by a hydraulic servo valve.

* * * * *